(12) United States Patent
Shang et al.

(10) Patent No.: US 8,996,458 B2
(45) Date of Patent: Mar. 31, 2015

(54) HIGH VOLUME, HIGH SPEED ADAPTIVE DATA REPLICATION

(75) Inventors: Heping Shang, Walnut Creek, CA (US); Mingchen Lo, Fremont, CA (US)

(73) Assignee: Sybase, Inc., Dublin, CA (US)

( * ) Notice: Subject to any disclaimer, the term of this patent is extended or adjusted under 35 U.S.C. 154(b) by 839 days.

(21) Appl. No.: 12/646,321

(22) Filed: Dec. 23, 2009

(65) Prior Publication Data

US 2011/0153568 A1 Jun. 23, 2011

(51) Int. Cl.
*G06F 17/30* (2006.01)
*G06F 11/20* (2006.01)

(52) U.S. Cl.
CPC ...... *G06F 11/2094* (2013.01); *G06F 17/30575* (2013.01); *G06F 11/2097* (2013.01); *G06F 2201/80* (2013.01); *G06F 2201/82* (2013.01)
USPC ............................ 707/615; 707/648; 702/181

(58) Field of Classification Search
CPC ................................................ G06F 17/30073
USPC ................... 707/648, 615; 702/181
See application file for complete search history.

(56) References Cited

U.S. PATENT DOCUMENTS

| | | | | |
|---|---|---|---|---|
| 5,870,765 | A * | 2/1999 | Bauer et al. | 707/610 |
| 6,615,223 | B1 * | 9/2003 | Shih et al. | 707/625 |
| 6,865,508 | B2 * | 3/2005 | Ueki et al. | 702/181 |
| 6,952,692 | B1 * | 10/2005 | Bhattiprolu et al. | 707/704 |
| 6,996,589 | B1 * | 2/2006 | Jayaram et al. | 1/1 |
| 7,051,334 | B1 * | 5/2006 | Porter et al. | 719/313 |
| 7,194,486 | B2 * | 3/2007 | Ishikawa et al. | 1/1 |
| 7,565,661 | B2 * | 7/2009 | Sim-Tang | 719/318 |
| 8,060,889 | B2 * | 11/2011 | Sim-Tang | 719/318 |
| 8,121,978 | B2 * | 2/2012 | Wiss et al. | 707/615 |
| 8,126,848 | B2 * | 2/2012 | Wagner | 707/648 |
| 8,650,150 | B2 * | 2/2014 | Zhao et al. | 707/600 |
| 2002/0165724 | A1 * | 11/2002 | Blankesteijn | 705/1 |
| 2003/0126133 | A1 * | 7/2003 | Dattatri et al. | 707/10 |
| 2004/0193952 | A1 * | 9/2004 | Narayanan et al. | 714/13 |
| 2005/0193021 | A1 * | 9/2005 | Peleg | 707/200 |
| 2005/0251540 | A1 * | 11/2005 | Sim-Tang | 707/202 |
| 2005/0273474 | A1 * | 12/2005 | Kawamura et al. | 707/200 |
| 2007/0067664 | A1 * | 3/2007 | Lindsay et al. | 714/5 |
| 2007/0226274 | A1 * | 9/2007 | Nishino | 707/204 |
| 2008/0034014 | A1 * | 2/2008 | Beck et al. | 707/204 |
| 2008/0059469 | A1 * | 3/2008 | Pruet | 707/8 |
| 2010/0250566 | A1 * | 9/2010 | Paul | 707/756 |
| 2011/0173619 | A1 * | 7/2011 | Fish | 718/101 |

* cited by examiner

*Primary Examiner* — Noosha Arjomandi
(74) *Attorney, Agent, or Firm* — Sterne Kessler Goldstein & Fox P.L.L.C.

(57) ABSTRACT

System, method, computer program product embodiments and combinations and sub-combinations thereof for data replication in a database system environment are described. In an aspect, the data replication includes grouping, in-memory, a plurality of transactions to be replicated as a single transaction from a source database system to a target database system. A plurality of net row changes is compiled for the plurality of transactions, and data inconsistency detection and resolution within a command application order are performed. Further included is bulk application of the plurality of net row changes to the target database system.

20 Claims, 4 Drawing Sheets

| Rows per Transaction | ASE Insert | ASE Update | ASE Delete | IQ Insert | IQ Update | IQ Delete |
|---|---|---|---|---|---|---|
| 1 | 0.77 | 0.37 | 0.37 | 0.49 | 0.23 | 0.36 |
| 10 | 4.03 | 1.03 | 1.02 | 0.78 | 0.74 | 1.73 |
| 100 | 3.36 | 1.91 | 2.21 | 0.54 | 3.25 | 11.45 |
| 1000 | 3.72 | 3.48 | 3.85 | 1.52 | 28.36 | 168.09 |
| 10000 | 4.31 | 21.82 | 33.57 | 11.94 | 338.88 | 1452.91 |

FIG. 3

HIGH VOLUME, HIGH SPEED ADAPTIVE DATA REPLICATION

BACKGROUND

1. Field of the Invention

The present invention relates generally to data processing environments and, more particularly, to a system providing methodology for high volume, high speed adaptive data replication.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Increasingly, businesses run mission-critical systems which store information on database management systems. Each day more and more users base their business operations on mission-critical systems which store information on server-based database systems, such as Sybase® Adaptive Server® Enterprise (ASE) (available from Sybase, Inc. of Dublin, Calif.). As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach that is used to guard against loss of critical business data maintained in a given database (the "primary database") is to maintain one or more standby or replicate databases. A replicate database is a duplicate or mirror copy of the primary database (or a subset of the primary database) that is maintained either locally at the same site as the primary database, or remotely at a different location than the primary database. The availability of a replicate copy of the primary database enables a user (e.g., a corporation or other business) to reconstruct a copy of the database in the event of the loss, destruction, or unavailability of the primary database.

Replicate database(s) are also used to facilitate access and use of data maintained in the primary database (e.g., for decision support and other such purposes). For instance, a primary database may support a sales application and contain information regarding a company's sales transactions with its customers. The company may replicate data from the primary database to one or more replicate databases to enable users to analyze and use this data for other purposes (e.g., decision support purposes) without interfering with or increasing the workload on the primary database. The data that is replicated (or copied) to a replicate database may include all of the data of the primary database such that the replicate database is a mirror image of the primary database. Alternatively, only a subset of the data may be replicated to a given replicate database (e.g., because only a subset of the data is of interest in a particular application).

In recent years, the use of replication technologies has been increasing as users have discovered new ways of using copies of all sorts of data. Various different types of systems, ranging from electronic mail systems and document management systems to data warehouse and decision support systems, rely on replication technologies for providing broader access to data. Over the years, database replication technologies have also become available in vendor products ranging from simple desktop replication (e.g., between two personal computers) to high-capacity, multi-site backup systems.

Database replication technologies comprise a mechanism or tool for replicating (duplicating) data from a primary source or "publisher" (e.g., a primary database) to one or more "subscribers" (e.g., replicate databases). The data may also be transformed during this process of replication (e.g., into a format consistent with that of a replicate database).

In many cases, a primary database may publish (i.e., replicate) items of data to a number of different subscribers. Also, in many cases, each of these subscribers is only interested in receiving a subset of the data maintained by the primary database. In this type of environment, each of the subscribers specifies particular types or items of data ("subscribed items") that the subscriber wants to receive from the primary database.

In performing replication, a known approach provides continuous replication, where data flows to the replicate database continuously with every log row change replicated. Transaction consistency is maintained. An alternate approach known as snapshot or ETL (extract-transform-load) replication replicates net row changes, where data flows to the replicate database in bursts (e.g., hourly, daily, etc.), and transaction consistency may not be maintained properly.

While each of these approaches may be satisfactory for certain environments, neither is satisfactory for OLTP (online transaction processing) archiving or reporting systems. Replicating every log row change continuously tends to be too slow and bogs down the reporting system operations. The snapshot approach does not provide transaction consistency or up-to-date data.

One approach to dealing with the replication needs of an OLTP reporting system is provided in "IQ real time loading" solution for the Sybase IQ product from Sybase, Inc. of Dublin, Calif. As its name suggests, the approach provides more real-time loading of replication data for an OLTP reporting system. However, there are usability and manageability issues with the approach resulting from the need to use an external staging database, as well as data modeling toolsets, and external refresh processes, along with requiring modifications by the system administrators for multiple tables and function strings.

Besides usability and manageability issues, there are also performance issues. For example, the throughput for the replication is limited by what can be replicated to the staging database. Also, during a data refresh process, the data server interface (DSI) operation has to be suspended, data has to be populated from the staging database to the reporting system, and the staging database has to be cleaned up before DSI can be resumed. This hinders performance, and while there are alternatives to potentially parallelize the DSI and refresh process, they add more complexity to this already complicated solution.

Accordingly, a need exists for an approach to data replication for OLTP reporting systems that achieves better performance and provides transactional consistency, with continuous data flow without requiring an external staging database or the need to suspend replication. The present invention addresses such a need.

BRIEF SUMMARY

Briefly stated, the invention includes system, method, computer program product embodiments and combinations and sub-combinations thereof for data replication in a database system environment. In an aspect, the data replication includes grouping, in-memory, a plurality of transactions to be replicated as a single transaction from a source database system to a target database system. A plurality of net row changes is compiled for the plurality of transactions, and data inconsistency detection and resolution within a command application order are performed. Further included is bulk application of the plurality of net row changes to the target database system.

Through the embodiments and aspects of the invention, replication performance for database warehousing or reporting systems, such as the IQ product from Sybase, Inc., as well as relational database server systems, such as the ASE product from Sybase, can be done faster than traditional continuous mode replication techniques. Further, the invention improves upon staging-type approaches by avoiding the use of an external staging database, providing improved usability with no need to suspend replication, and reducing maintenance costs. Additionally, no application replication change is required. Overall, transactional consistency is achieved with continuous data flow and significant replication throughput improvement.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 3 is a chart illustrating experimental data replication results in accordance with an embodiment of the present invention.

Figure 1:
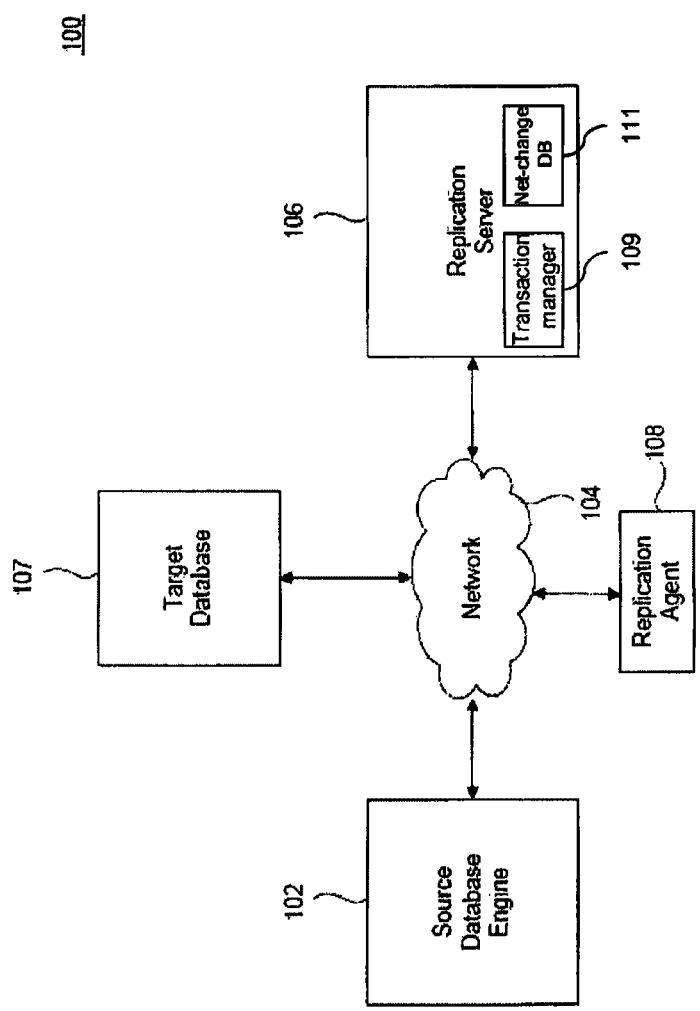
FIG. 1 illustrates a network in which the present invention, or portions thereof, can be implemented, in accordance with an embodiment of the present invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for high volume, high speed adaptive data replication.

FIG. 1 is a network 100 in which the present invention, or portions thereof, can be implemented. A source database engine 102 is able to communicate over network 104 with replication server 106 via replication agent 108, in accordance with an embodiment of the present invention.

Network 104 can be any type of network or combination of networks such as, but not limited to, a local area network, wide area network, or the Internet. Network 104 may be any form of a wired network or a wireless network, or a combination thereof.

Also in communication over network 104 is a replication agent 108. The replication agent 108 facilitates the replication process by, in accordance with an embodiment of the present invention, scanning a transaction log for changes at source database engine 102 and sending those changes to replication server 106. One skilled in the relevant arts will further recognize that the network 100 can be configured in a number of ways in order to achieve the same result, and the aforementioned configuration is shown by way of example, and not limitation. For instance, in accordance with an embodiment of the present invention, replication agent 108 and source database engine 102 are located in a single physical computing device or cluster of computing devices.

Source database engine 102 comprises a source database and a transaction log, in accordance with an embodiment of the present invention. Every transactional operation, including inserts, updates, and deletes to the database, causes a log record to be written to the transaction (primary) log, which is commonly referred to simply as the "log." (For further information on logging operations in a database system, see e.g., U.S. Pat. No. 6,321,234 titled "Database server system with improved methods for logging transactions"). Each particular log record characterizes the change which has occurred to the primary database 102 during processing of a transaction. These log records can be used, for instance, in error recovery, to restore the database 102 to a preexisting, consistent state.

In a traditional log-based replication system, changes to the source database 102 are sent to replication server 106 over network 104, which then applies these changes, over network 104, directly to target database 107. As example of such a system is described in U.S. patent application Ser. No. 11/309,387, publication no. 20080034014, entitled "Replication System with Methodology for Replicating Stored Procedure Calls", and assigned to the assignee of the present invention. As is commonly understood, the replication server 106 starts DSI threads, which are responsible for transferring the data from an outbound queue to the target database 107.

Figure 2:
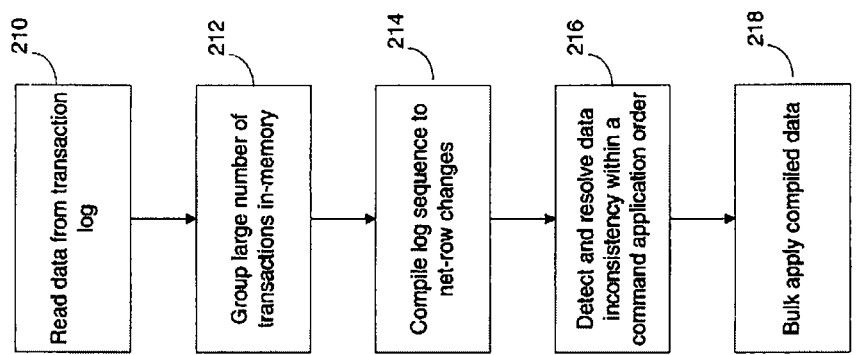
FIG. 2 is a flowchart illustrating an overall process by which a replication server facilitates high volume, high speed adaptive replication, in accordance with an embodiment of the present invention.

To improve upon traditional replication, the present invention provides an approach to replication for high volume and high speed that is adaptive to the conditions of the data being replicated. Referring now to FIG. 2, a block flow diagram of an overall process for replication in accordance with embodiments of the invention is illustrated. The process initiates with the reading of transaction log data in the same manner as in traditional continuous replication (block 210). Once read, a large number of transactions are grouped (block 212) into a single transaction.

In an embodiment, the process the replication server 106 uses parameters to determine when to start and stop transaction grouping. For example, a parameter, e.g., dsi_compile_max_cmds, can be provided to specify when replication should finish a current transaction grouping and start a new group, for example, 100,000 commands. Similarly, if there is no more data to read, the current group can be finished regardless of the maximum size. Stopping may also occur when a transaction is encountered that contains non-compilable commands. Examples of non-compilable commands include function (stored procedure), SQL statement (SQL statement replication), DDL (data definition language), system transaction, internal markers, and the like. In general, replication groups as many transactions as possible. Further, the grouping occurs such that transactions of different origins can be grouped together.

The transaction module 109 further compiles a transaction and converts log order row changes to net-row changes (block 214). In accordance with embodiments of the invention, the net row changes are saved in a net-change database 111, which can include mixed commands, some compiled and stored into tables, namely, an insert table, update table, and delete table, and some non-compiled and stored in log sequence. Further, the net-change database can be provided as an internal implementation, or alternatively, utilizing an embedded light weight in-memory database. As an internal implementation, the net-change database 111 provides high performance and avoids being a replication performance bottleneck while supporting multiple database instances, where each instance contains multiple sets of insert/update/delete tables, and each replicate table has one set of insert/update/delete tables. Access support to the net-change database 111 by external processes through Open Client interfaces allows simplified "select" statements to be used with administration, maintenance, diagnostic, and the like done through additional system administration commands, as is well appreciated by those skilled in the art. As can be further appreciated, accessibility by internal modules can occur through 'C' language functions, such that callers can create, clone, and/or drop a database instance, insert an inserted/update/deleted row to a database instance, or select an internal table from a database instance.

In order to determine the net row changes for storing in the net change database 111, the changes of the source database engine 102 are tracked. In accordance with embodiments of the invention, when tracking inserts during the replication process, each inserted row is simply added to the insert table. In normal cases, the inserted row should not already exist in the insert table. If it does already exist (i.e., there is a duplicate key violation), an error can be raised.

The replication process also tracks updates in an update table based on before and after images of the update. For example, if the update before image matches an after image in the update table, the after image of the existing update row is replaced with the after image of the newly updated row. If the update before image matches a row in the insert table, the row in the insert table is replaced with the after image. If the update before image matches a before image of the update table or exists in the delete table (update zero row), or the update after image exists in the insert table (duplicate key violation), an error is reported. Exceptions to the update tracking occur, for example, if an auto-correction setting is active. In this case, updates are converted to deletes followed by inserts. Or, if a table has no replication definition, its updates will be converted to deletes followed by inserts. Alternatively, if an update changes primary keys, the update is converted to a before image delete and an after image insert.

When tracking deletes, if the delete row exists in the internal insert table, the row is removed from the insert table. If the delete row matches an after image in the internal update table, the matching update row is removed from the update table. If the delete row matches a before image in the update table or exists in the delete table (delete zero row), an error is reported. Once verified against these possibilities in this manner, the delete row is inserted to the delete table of the net change database 111.

Once the tracking completes and the net row changes are compiled, the command order to be applied may cause data inconsistencies. Detection and resolution of these inconsistencies within the command application order are performed (block 216), such that they can be avoided through command reordering. For example, since a compiled transaction can contain multiple replicated tables and each replication table can have up to three net change tables, detection is based at least in part on referential constraints. Thus, if table A references table B, deletes to table A must be applied before table B, and inserts to table A must be applied after table B. In this manner, resolvable ones are able to be applied according to the replication processing order, while non-resolvable ones are made non-compilable and are able to be applied in their log sequence.

Following detection and resolution, bulk application occurs (block 218) to the target database 107. In general, deletes need to be applied before inserts and updates can be applied in any order. For tables with referential constraints, inserts to parent tables must be applied first and deletes to child tables must be applied first. In an embodiment, except for work table cleanup and pre-load, the whole applying process is wrapped in a single transaction. If the transaction fails during the applying process, it is regrouped into several smaller transactions to be tried one by one, which continues until the failing transaction is successfully identified. Once found, the transaction is retried, with the appropriate error action taken as specified by the connection error class, as is commonly understood.

Alternatively, for example, for some situations, such as those employing IQ, pull can perform much faster than push. Thus, replication can be performed such that the target database is allowed to pull data from the replication server, e.g., by allowing the target database to treat the replication server as a remote database and be able to select the insert and delete tables from the replication server. Alternatively, DSI may replicate data to files, to replicate data to network sockets, to use ODBC interfaces, or to use bulk update and delete interfaces.

In an alternate embodiment, for a target database 107 that does not support bulk update/delete interfaces, work tables are employed in the target database 107. For example, the rows from the replicate tables are deleted by joining them with the delete work tables. Similarly, update tables are bulk copied into work tables in the target database 107, and then the replicate tables are updated by joining them with the work tables.

Further alternatives are possible to achieve optimal replication throughput. For example, when an environment supports tables that can be loaded quickly by methods such as ODBC (open database connectivity), they can be used to create the work tables. An example of such an environment is Sybase IQ with Adaptive Server Anywhere tables. In other environments, such as a Sybase ASE environment, tempdb (temporary database) space, which usually is on fast devices, can be used to create the work tables. Further, by putting net row changes in a single table having an extra column to indicate the row operation, one work table can be loaded instead of three, with 'select into' and 'join' operations used to populate net changes to the replicate table, as is well appreciated by those skilled in the art. Another alternative is to reduce update tables to changed columns only. By not including unchanged columns in work tables, the load and join costs are reduced. Additionally, for databases such as Oracle and MSSQL that support bulk update and delete operations, update and delete tables can be directly bulk applied to the target databases 107.

As described, instead of replaying every row change made at the primary database, in accordance with embodiments of the invention, replication applies only the net row changes of a transaction. While transactional consistency is still guaranteed, intermediate row changes will be skipped. An implication of this is that if triggers are defined at the target database 107, they will be not fired on compiler removed row changes. Further, row changes are not applied in the same order as they were logged. Thus, if triggers of a table have to be fired all the time or if a replicated table is required to be applied in log order, compilation needs to be disabled for that table. Additionally, replication will not modify tables in the same order as they were logged. Thus, if there are referential constraints defined on replicate tables, the referential constraints need to be specified in replication definitions, since the replication loads tables according to replication definitions to avoid constraint errors.

The following example is provided to help illustrate the replication processing in accordance with the present invention. Suppose there are two replicate tables, Table A: (k1, c1, c2)
Table B: (k2, v1, v2, v3, v4) with a log sequence of:
Begin transaction
Insert A values (1, 1, 1)
Insert A values (2, 2, 2)
Commit transaction
Begin transaction
Insert B values (10, 10, 10, 10, 10)
Insert B values (20, 20, 20, 20, 20)
Insert B values (30, 30, 30, 30, 30)
Commit transaction
Begin transaction
Delete A where k1=2
Delete A where k1=3
Update A set c1=10 where k1=1
Update A set c2=20 where k1=1
Update A set c1=1, c2=2 where k1=10
Commit transaction
Begin transaction
Update B set v1=11 where k2=10
Update B set v2=11 where k2=10
Update B set v1=21, v2=21 where k2=20
Update B set v1=12 where k2=10
Update B set k2=40 where k2=30
Commit transaction
After reading this log sequence (block 210, FIG. 2), the transaction grouping (block 212) results in:
Begin transaction
Insert A values (1, 1, 1)
Insert A values (2, 2, 2)
Insert B values (10, 10, 10, 10, 10)
Insert B values (20, 20, 20, 20, 20)
Insert B values (30, 30, 30, 30, 30)
Delete A where k1=2
Delete A where k1=3
Update A set c1=10 where k1=1
Update A set c2=20 where k1=1
Update A set c1=1, c2=2 where k1=10
Update B set v1=11 where k2=10
Update B set v2=11 where k2=10
Update B set v1=21, v2=21 where k2=20
Update B set v1=12 where k2=10
Update B set k2=40 where k2=30
Commit transaction
Compilation (block 214) results in:
Insert A values (10, 20, 1)
Delete A where k1=3
Update A set c1=1, c2=2 where k1=10
Insert B values (10, 11, 12, 10, 10)
Insert B values (20, 21, 20, 20, 20)
Insert B values (30, 30, 30, 30, 40)

Detection and resolution of data inconsistency with the command application order (block 216) and application (218) follow to replicate the log sequence as:
Delete A where k1=3
Insert A values (10, 20, 1)
Insert B values (10, 11, 11, 10, 10)
Insert B values (20, 21, 21, 20, 20)
Insert B values (30, 30, 30, 30, 40)
Update A set c1=1, c2=2 where k1=10

In an embodiment, table level configuration parameters are utilized to support modifications of the processing and are stored in a table of the replication server 106. Unlike database level parameters which impact an entire replicate database, table level parameters work only on the specified replicate tables. In a preferred embodiment, if a parameter can be specified at both the table level and the database level, the table level takes high precedence over the database level. Further, if a table level parameter is not specified, it defaults to the database level setting.

By way of example, one such parameter, e.g., dsi_compile_enable, can be used to turn on/off compilation, which allows control should replicating net row changes causes unexpected consequences. Another parameter, e.g., dsi_command_convert, can be used to specify how a replicate command can be converted, such as by values including "i" for insert, "u" for update, "d" for delete, "t" for truncate table and "none" for none operation. In this manner, for example, specifying "d2none" would indicate do not replicate delete command, while "i2di,u2di" would indicate convert both insert and update to delete followed by insert. Specifying "t2none" would indicate do not replicate truncate table command. In an embodiment, this parameter can be configured at database level and set to have a default value of "none".

As previously described, replication also accounts for referential constraints based on a specified definition and will retry the transaction in log sequence when necessary. During the bulk applying time, replication loads inserts (or deletes) to the referenced tables before (or after) the replication definition table. If multiple referential constraints are specified, such that there is a circular referential situation, the replication server 106 arbitrarily picks a break in the loop. In an embodiment, the system table of the replication server 106 is changed to include two new columns, e.g., ref_objname and ref_objowner, to accommodate referential constraints.

To avoid replication retry, which has a big performance impact, referential constraints can be disabled at the target database, or replication updates can be altered by setting dsi_command_convert to "u2di", i.e., converting updates to deletes and inserts, or dsi_compile_enable can be utilized to turn off the compilation to avoid compiling the trouble tables.

Further, incremental compilation can be used to compile a transaction up to a certain point before invoking the applying process to apply what has been compiled to that point. When the applying process returns, incremental compilation resumes and continues the process up to a new stop point. Such incremental compilation may be needed when there are transactions that contain non-compilable commands and transactions that cannot fit in memory.

Comparing continuous row-by-row operations vs. net-row bulk operations results in clear performance gain through the use of the embodiments of the invention. By way of example, for TPCC table order-line (ol_o_id int, ol_d_id tinyint, ol_w_id smallint, ol_number tinyint, ol_i_id int, ol_supply_w_id smallint, ol_delivery_d datetime, ol_quantity smallint, ol_amount float, ol_dist_info char(24)), with 10 columns and 56 bytes per row, resulting ratios of the adaptive replication and traditional continuous replication are illustrated in chart 300 of FIG. 3. In producing the data of chart 300, an assumption was made that continuous replication uses language interfaces, adaptive replication to IQ uses insert location command to load inserts to replicate tables, uses insert location command to load update/delete to work tables, and uses join to update/delete replication tables by work tables, while adaptive replication to ASE uses bulk interfaces to load inserts to replicate tables, uses bulk interfaces to load update/delete to work tables, and uses join to update/delete replicate tables by work tables. As shown by chart 300, when TPCC order-line were replicated and contained 10,000 updates, the ratios indicate that adaptive replication performed about 21.82 times faster than the continuous mode for an ASE environment, and about 338.88 times faster for an IQ environment.

Thus, through the embodiments and aspects of the invention, replication performance for database warehousing or reporting systems, such as the IQ product from Sybase, Inc., as well as relational database server systems, such as the ASE product from Sybase, can be done faster than traditional continuous mode replication techniques. Further, the invention improves upon staging-type approaches by avoiding the use of an external staging database, providing improved usability with no need to suspend replication (e.g., by way of automatic scheduling), and reducing maintenance costs (e.g., by way of not requiring external scripts). Additionally, no application replication change is required. Overall, transactional consistency is achieved with continuous data flow and significant replication throughput improvement.

Figure 4:
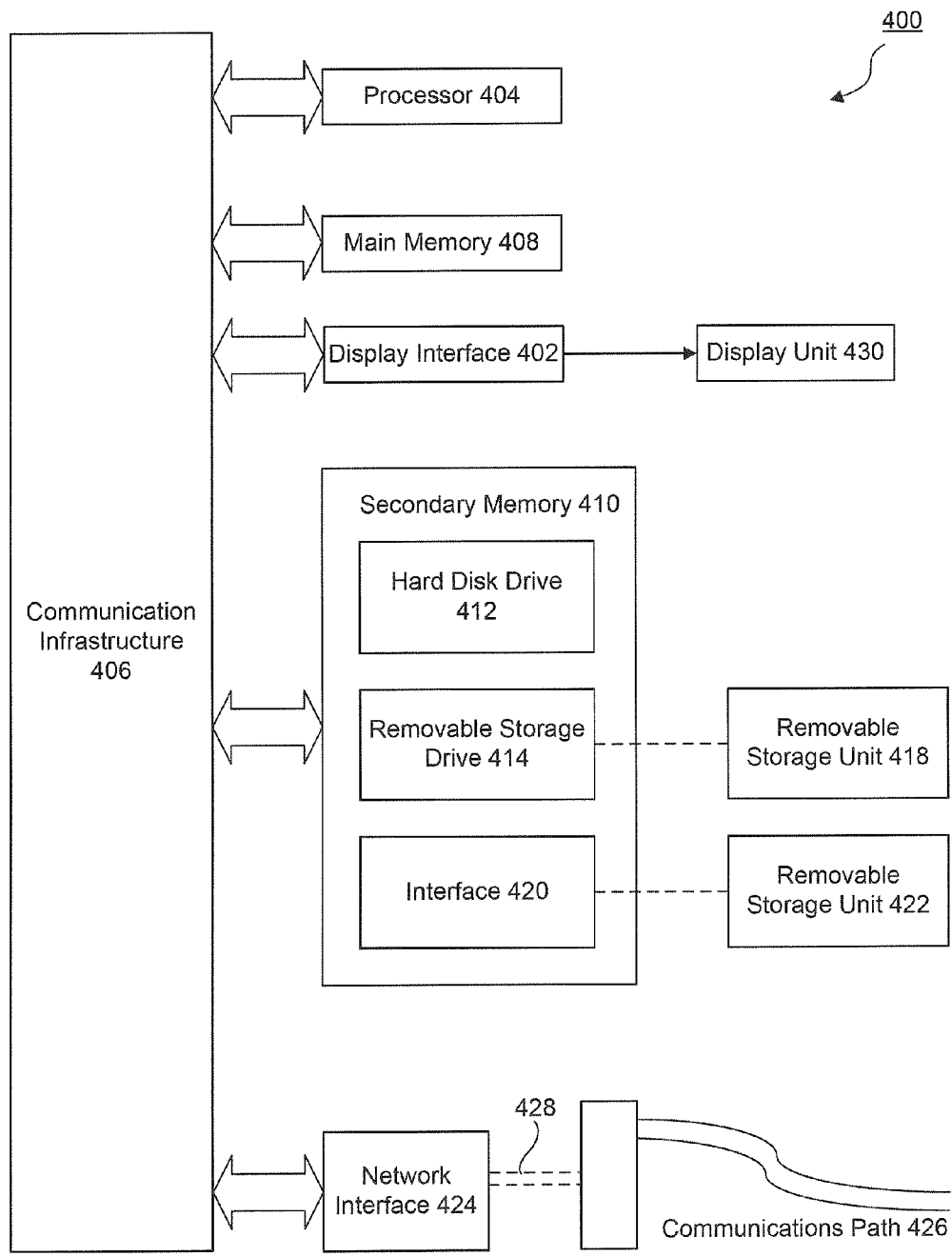
FIG. 4 illustrates an example computer useful for implementing components of embodiments of the invention.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by flowchart of FIG. 2, can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the method illustrated by the flowchart of FIG. 2. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method for data replication in a database system environment, the method comprising:
   grouping, in-memory, a plurality of transactions to be replicated from a source database system to a target database system, the plurality of transactions including log order row changes;
   converting the log order row changes to a plurality of net row changes;
   performing data inconsistency detection and resolution within a command application order of the plurality of net row changes_from the plurality of transactions of the source database system to create a plurality of consistent net row changes; bulk applying the plurality of consistent net row changes to the target database system;
   determining one or more non-resolvable net row changes based on the data inconsistency detection and resolution. wherein non-resolvable net row changes include net row changes that cannot be bulk applied to the target database system; and
   applying the non-resolvable net row changes using order row changes associated, with each non-resolvable pet row change to the target database.

2. The computer-implemented method of claim 1 wherein bulk applying, further comprises rearranging the plurality of consistent_net row changes and clustering on a per table basis.

3. The computer-implemented method of claim 1 wherein converting the log order row changes further comprises tracking log-ordered, row-by-row changes, converting the log-ordered, row-by-row changes into net row changes, and storing the net row changes.

4. The computer-implemented method of claim 3 wherein storing further comprises storing in at least one of an insert table, an update table, and a delete table.

5. The computer-implemented method of claim 3 wherein bulk applying the plurality of consistent net row changes further comprises sorting the net row changes.

6. The computer-implemented method of claim 5 wherein bulk applying further comprises bulk inserting inserted data, and bulk inserting updates and deletes to work tables.

7. The computer-implemented method of claim 6 further comprising utilizing join-update and join-delete of the work tables with replicate tables for bulk updates and deletes.

8. The computer-implemented method of claim 1 wherein performing further comprises identifying commands requiring replication according to log sequence order and determining an order for applying commands based on referential constraints.

9. A system for data replication in a database system environment, the system comprising:
   a source database;
   a target database in communication with the source database; and
   a replication server, implemented on a computing device, in communication with the source database and target database, the replication server grouping, in-memory, a plurality of transactions to be replicated from the source database system to the target database system, the plurality of transactions including log order row changes, converting the log order row changes to a plurality of net row changes, performing data inconsistency detection and resolution within a command application order of the plurality of net row changes from the plurality of transactions of the source database system to create a plurality of consistent net row changes, bulk applying the plurality of consistent net row changes to the target database system, determining one or more non-resolvable net row changes based on the data inconsistency detection and resolution, wherein non-resolvable net row chances include net row changes that cannot be bulk applied to the target database system, and applying the non-resolvable net row changes using log order row changes associated with each non-resolvable net row change to the target database;
   wherein at least one of the source database, the target database, and the replication server are implemented on one or more computers.

10. The system of claim 9 wherein the replication serve further bulk applies by rearranging the plurality of consistent net row changes and clustering on a per table basis.

11. The system of claim 9 wherein the replication server further converts the log order row changes by tracking log-ordered, row-by-row changes, converting the log-ordered, row-by-row changes into net row changes, and storing the net row changes.

12. The system of claim 11 wherein the replication server further stores in at least one of an insert table, an update table, and a delete table.

13. The system of claim 11 wherein the replication server further bulk applies the plurality of consistent net row changes by sorting the net row changes, bulk inserting inserted data, and bulk inserting updates and deletes to work tables.

14. The system of claim 13 wherein the replication server further utilizes join-update and join-delete of the work tables with replicate tables for bulk updates and deletes.

15. The system of claim 9 wherein the replication server further performs data inconsistency detection and resolution within a command application order by identifying commands requiring replication according to log sequence order and determining an order for applying commands based on referential constraints.

16. A computer-readable storage device having instructions stored thereon, execution of which, by a computing device, causes the computing device to perform operations for data replication in a database system environment, the operations comprising:

grouping, in-memory, a plurality of transactions to be replicated from a source database system to a target database system, the plurality of transactions including log order row changes;

converting the log order row changes to a plurality of net row changes;

performing data inconsistency detection and resolution within a command application order of the plurality of net row changes_from the plurality of transactions of the source database system to create a plurality of consistent net row changes; bulk applying the plurality of consistent net row changes to the target database system; determining one or more non-resolvable net row based on the data inconsistency detection and resolution, wherein non-resolvable net row changes include net row changes that cannot be bulk applied to the target database system; and applying the non-resolvable net row charges using log order row changes associated with each non-resolvable net row change to the target database.

17. The computer-readable storage device of claim 16 wherein bulk applying further comprises rearranging the plurality of consistent_net row changes and clustering on a per table basis.

18. The computer-readable storage device of claim 17 wherein bulk applying further comprises sorting the consistent net row changes, bulk inserting inserted data, bulk inserting updates and deletes to work tables, and utilizing join-update and join-delete of the work tables with replicate tables for bulk updates and deletes.

19. The computer-readable storage device of claim 16 wherein converting the log order row changes further comprises tracking log-ordered, row-by-row changes, converting the log-ordered, row-by-row changes into net row changes, and storing the net row changes.

20. The computer-readable storage device of claim 16 wherein performing further comprises identifying commands requiring replication according to log sequence order and determining an order for applying commands based on referential constraints.

* * * * *